April 12, 1960

J. R. HUBBARD ET AL 2,932,219

DRIVE MECHANISM

Filed July 7, 1958

INVENTORS
JAMES R. HUBBARD
ALFRED G. STAENGLE

BY

ATTORNEY

United States Patent Office 2,932,219
Patented Apr. 12, 1960

2,932,219

DRIVE MECHANISM

James R. Hubbard, Moorestown, N.J., and Alfred G. Staengle, Philadelphia, Pa., assignors to Philco Corporation, Philadelphia, Pa., a corporation of Pennsylvania Application July 7, 1958, Serial No. 746,888

8 Claims. (Cl. 74—722)

The present invention relates to drive mechanism and, particularly, to driving clutches. More specifically the invention herein disclosed and claimed has to do with a one-way friction clutch which, while of broader application, is especially adapted for use in an automatic washing machine of the type having a rotatable tub for spin-drying clothes and an oscillatory agitator mounted in the tub for washing the clothes.

This type of washing machine when provided with a driving clutch of the above mentioned variety, has the advantage that the change from washing action to spin-drying action can be obtained merely by reversing the direction of the driving motor. However, constructional difficulties and operational problems arise when attempts are made to devise a one-way friction clutch for use with a multi-speed reversible motor to obtain oscillation of the agitator and spinning of the tub at one speed for heavier and coarser type fabrics and at another and slower speed for lighter and finer type fabrics.

It is therefore a primary object of this invention to overcome the above noted difficulties and problems by providing an improved and simplified frictional clutch which is capable of delivering driving torque regardless of the speed or rotating direction of the motor, and which is adapted to slip should too great a resistance oppose the starting or running torque of the motor.

Another object of the invention is to provide a clutch assembly adapter for mounting directly on the shaft of a reversible multi-speed motor and capable of delivering a driving torque at any speed at which the motor rotates.

Still another object of the invention resides in the provision of a clutch construction which incorporates means for maintaining a constant torque at all speeds.

A characteristic feature of a clutch constructed in accordance with this invention resides in the fact that the clutch which serves to spin the clothes-containing tub also serves to limit the rotational speed of the spin tub in the presence of an excessive torque load, for example an excessive load due to an unbalance condition in the tub.

In attainment of these objects and features, the invention employs a pair of clutching elements which are mounted between and concentrically with a pair of motion transmitting members. These members are journalled for rotation in coaxial relation with respect to each other. Resilient or spring means is utilized to urge and maintain the clutching elements in constant frictional engagement with each other, the tension of said resilient means being adjustable so as to vary the frictional force with which the clutching elements engage each other, one of said members being drivingly connected to one of the clutching elements, the other of said members being drivingly connected to the other of the clutching elements.

The nature of the invention and the manner in which the above noted as well as other objects and advantages of the invention are attained, will be more fully understood from the following description taken in connection with the accompanying drawing, in which.

Figure 1:
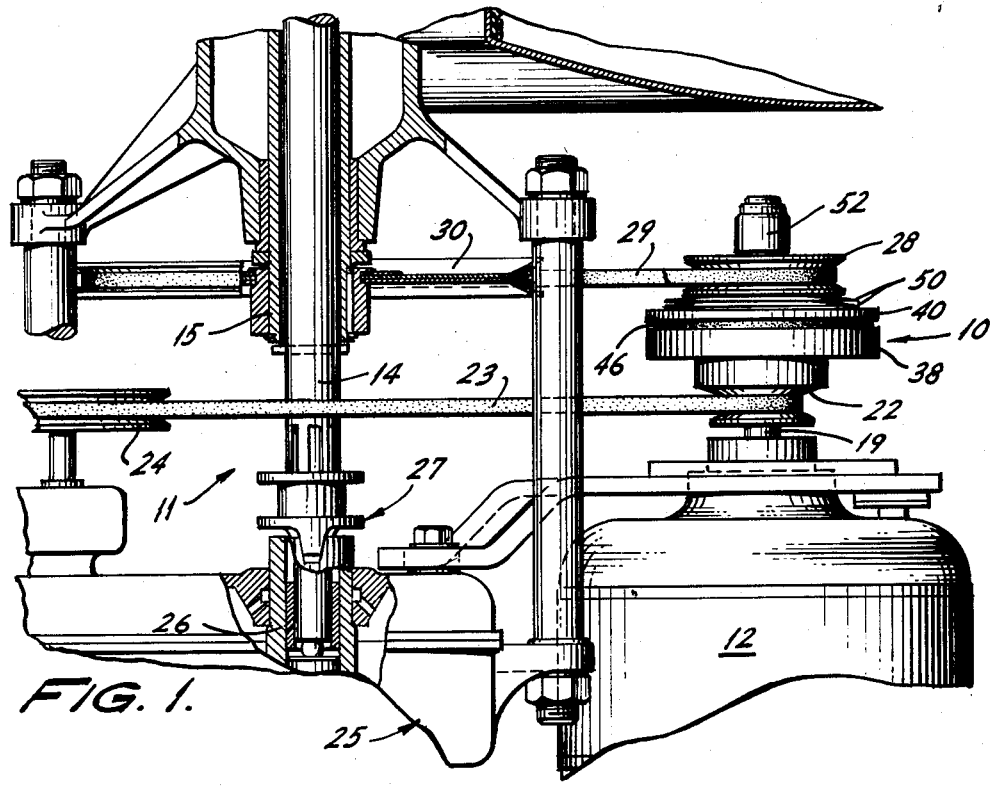
Figure 1 is a fragmentary elevational-sectional view showing a portion of an automatic washing machine equipped with a one-way clutch embodying the present invention.

With more particular reference to the drawings, there is shown in Figure 1 a preferred one-way clutch 10 embodied in an automatic washing machine 11. This particular machine 11 is equipped with a reversible driving motor 12 and is so arranged that reversing the motor will effect a change-over from washing action to spin-drying action. To this end the washing machine includes a vertical shaft 14 adapted to drive the conventional oscillatory agitator (not shown) which is disposed in a rotatable spin-drying tub (not shown) adapted to be driven by a hollow shaft 15 which is telescoped over the shaft 14.

Figure 2:
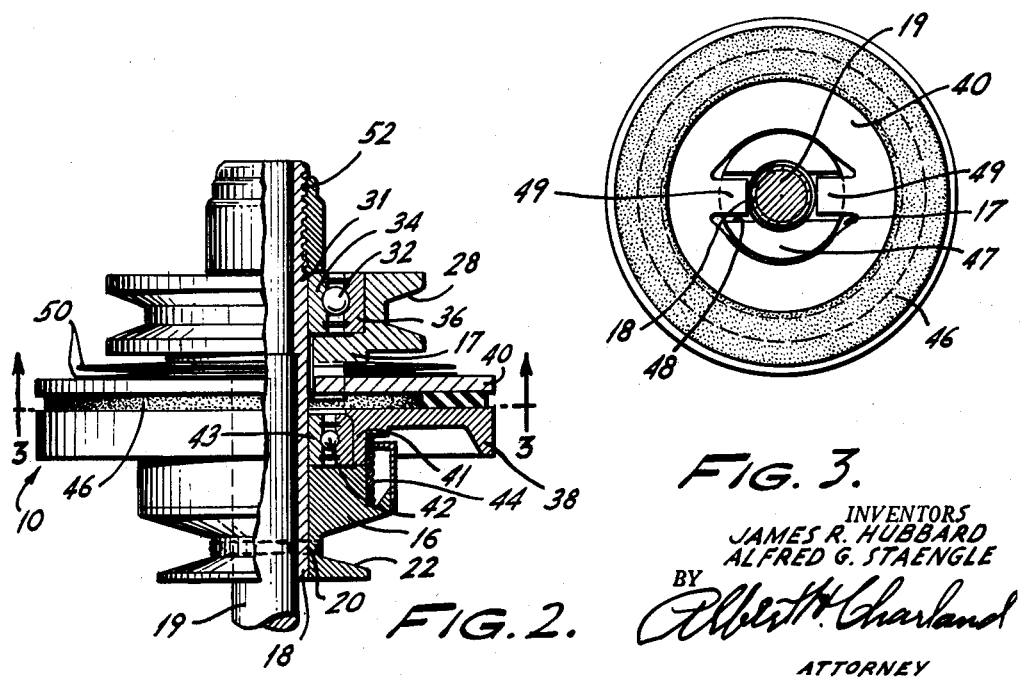
Figure 2 is an enlarged elevational-sectional view of the one-way clutch illustrated in Figure 1.

To drive the shafts 14 and 15, the illustrated clutch 10, as best seen in Figure 2, is provided with a pair of pulleys 16 and 17 rotatable about a common vertical axis. The first pulley 16 is mounted on a sleeve 18 which snugly fits over drive shaft 19 of the motor 12. A pin 20 passes through and is peened in aligned bores within said first pulley, said sleeve and said motor shaft so as to rigidly connect these three elements together for rotation as a unit. Formed on the first pulley 16 is a peripherally grooved portion 22 which, as illustrated in Figure 1, is connected by means of a V-belt 23 to drive a pulley 24. This latter pulley operates an agitator oscillating mechanism 25 adapted to translate the rotary motion of said pulley 24 into oscillatory motion of a pinion 26. A jaw-type clutch 27 is provided for selectively transmitting oscillatory movement of the pinion 26 to the main agitator shaft 14. Such agitator oscillating mechanisms are well known and since they form no essential parts of this invention they have not been shown and will not be described in detail herein. Reference may be had to the U.S. Patent to Johnson et al., No. 2,836,993 issued June 3, 1958 for arrangements suitable to impart the hereinabove mentioned oscillatory motion.

To rotate the spin tub hollow shaft 15, the other or second pulley 17 of the illustrated one-way clutch 10, is formed with a grooved portion 28 connected by means of a V-belt 29 to drive a pulley 30 mounted on said hollow shaft 15.

When the motor 12 is energized so as to rotate the motor shaft 19 in one direction, the one-way clutch 10 will be ineffective to transmit power to the second pulley 17, but the first pulley 16 will rotate with said motor shaft so that the belt 23 will be operative to drive the oscillating mechanism 25. For this direction of operation, the jaw clutch 27 will be engaged by suitable solenoid means (not shown) and the agitator shaft 14 will thus be oscillated to afford a washing action. If the motor 12 is operated in the opposite direction, the clutch 10 will transmit power to the second pulley 17 and thus to the spinner shaft 15 so as to provide a spin-drying action. For this direction of operation, the jaw clutch 27 will be disengaged to prevent the elements of the mechanism 25 from being driven.

In the construction illustrated in the drawing and as see in Figure 2, the second pulley 17 is adapted to rotate about an extended end portion 31 of the sleeve 18 and, for that purpose, there is provided a ball-bearing comprising a set of balls 32 mounted between inner and outer races 34 and 36. The ball-bearing is seated within a recess formed in the pulley 17 so that the inner race fits tightly over a portion of the sleeve extension 31, and the outer race 36 fits tightly against the inner peripheral wall of said recess.

To establish driving connection between the first pulley 16 and the second pulley 17, there is provided a pair of confronting clutch elements or plates 38 and 40 which are resiliently maintained in frictional interengagement, one of said plates being connected—through means described below—with said first pulley to be driven thereby, and the other of said plates being connected with said second pulley to drive the same. As illustrated in Figure 2 the lower clutch element or plate 38 is provided with a centrally apertured hub 41 which overlies the first pulley 16 and which is adapted to receive a ball bearing 42 the inner race 43 of which tightly fits about the sleeve 18.

Power is transmitted from the first pulley 16 to said lower clutch element 38 by means of a one-way clutching device which is in the convenient form of a coil spring 44 snugly embracing said first pulley. The coil spring 44 has a portion which encircles the hub 41 of the clutch plate 38. In this manner when the motor shaft 19 rotates in one (clockwise) direction the coil spring 44 slips about the hub 41 so that the clutch plate 38 remains idle. However when the motor shaft is rotated in the opposite (counterclockwise) direction then the coil spring tightens about said hub, in known fashion, and thereby transmits rotational motion to the clutch plate 38.

Figure 3:
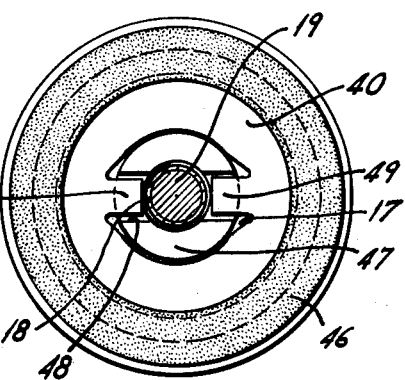
Figure 3 is a sectional view taken generally along line 3—3 of Figure 2 and drawn on a reduced scale.

This rotation of the clutch plate 38 is, in turn, transmitted to the other clutch plate 40 by reason of the frictional interengagement of said plates, the frictional driving of plate 40 being insured by means of frictional material 46 interposed between the confronting surfaces of said plates and bonded to one of said surfaces. As best seen in Figure 3, the second pulley 17 is provided with a hub 47 having a transverse groove 48 in engagement with tongues 49 rigid with the clutch plate 40 so that rotation of the latter is imparted to said pulley 17. Interengagement of the plates is maintained by resilient means which is in the form of spring discs 50 (Figures 1 and 2) adapted to impose a compression force on the upper clutch plate 40 to urge it in a direction to bear upon the other or lower clutch plate 38. Means which in the illustrated embodiment comprises a threaded nut 52 in screw-threaded engagement with the extension 31 of the sleeve 18, serves to adjust said resilient means or spring discs to vary the frictional interengagement between the clutch plates or elements 38 and 40. In the form illustrated in the drawings, the spring discs are interposed between the upper clutch plate 40 and the second pulley 17, and the adjustable screw threaded nut 52 is disposed to bear upon the upper surface of said pully 17 so as to cause the latter to impose greater or lesser pressure upon said spring discs to adjust their tension for the purpose hereinbefore indicated.

Because of the above described construction, rotation of the motor shaft 19 in that mentioned direction in which the coil spring 44 slips about the hub 41 of the lower clutch plate 38, will effect rotation of the first pulley 16 without rotating the motion transmitting clutch. Under this condition of operation, the mechanism operates to actuate the agitator while the spin tube remains stationary.

The rotation of the motor shaft in counterclockwise direction wherein the coil spring 44 tightens about the hub 41 of the lower clutch plate 38, causes said plate to rotate with the first pulley 16 thereby actuating the motion transmitting clutch to drive the second pulley 17. Under this condition, the second pulley 17 drives the belt 29 which rotates the pulley 30 and the shaft 15 to spin the tub.

From the foregoing description it will be apparent that the power transmitting function of the drive mechanism of this invention does not depend on centrifugal force and therefore the mechanism will deliver driving torque regardless of the rotational speed of the motor. For that reason it will be appreciated that the drive mechanism is especially capable of being employed with a two-speed motor, that is to say, a motor adapted to drive at one speed for agitating and spinning clothes of heavier or coarser fabrics, and at another and slower speed for agitating and spinning clothes of higher or finer texture.

Moreover it will be appreciated that excessive torque which develops when the clothes tub is started in its spinning motion, will result in slippage at the frictionally engaged faces of the clutch plates. However because the invention provides for varying the tension between these plates, the friction can be adjusted so that there is gradually decreasing slippage between them as the spin tube comes to full speed. When the tub is up to full speed, the clutch is in effect a solid pulley.

While a preferred embodiment has been shown and described, it will be understood that the invention is not limited to that embodiment, but is capable of being incorporated in various other embodiments or modifications coming within the spirit and scope of the subjoined claims.

What we claim is:

1. In combination with a reversibly rotatable driving shaft, a pair of pulleys mounted in axially spaced positions on said shaft, a pair of confronting plates mounted to rotate coaxially about said shaft and between said pulleys, spring means for imposing a compression force on one of said plates to urge the same in a direction for frictional engagement with the other of said plates, means for adjusting the tension of said spring means to adjust the friction between said plates, means connecting one of said pulleys to one of said plates, means connecting the other of said pulleys to said shaft, and means for drivingly coupling said other of said pulleys to the other of said plates in response to rotation of said shaft in one direction only.

2. In combination with a reversibly rotatable driving shaft, a pair of pulleys mounted in axially spaced positions on said shaft, a pair of confronting plates mounted to rotate coaxially about said shaft and between said pulleys, frictional material attached to one of said plates and disposed thereon for engagement with the other of said plates, spring means for imposing a compression force on one of said plates to urge the same in a direction for frictional engagement with the other of said plates, means for adjusting the tension of said spring means to adjust the friction between said plates, means connecting one of said pulleys to one of said plates, means connecting the other of said pulleys to said shaft, and means for drivingly coupling said other of said pulleys to the other of said plates in response to rotation of said shaft in one direction only.

3. In combination with a reversibly rotatable driving shaft, a pair of pulleys mounted in axially spaced positions on said shaft, a pair of confronting plates mounted coaxially with respect to each other and with respect to said pulleys, said plates being disposed between said pulleys, spring means interposed between one of said plates and one of said pulleys, said spring means being tensioned to impose a compression force on one of said plates to urge the same in a direction for frictional engagement with the other of said plates, means for adjusting the position of said one of said pulleys with respect to said one of said plates and thereby varying the force on said spring means to adjust the friction between said plates, means connecting said one of said pulleys to said one of said plates, means connecting the other of said pulleys to said driving shaft, and means for drivingly coupling said other of said pulleys to said other of said plates in response to rotation of said shaft in one direction only.

4. In combination with a reversibly rotatably driving shaft, a pair of pulleys mounted in axially spaced positions on said shaft, a pair of confronting plates mounted coaxially with respect to each other and with respect to said pulleys, said plates being disposed between said pulleys, one of said plates having frictional material attached thereto and disposed thereon for engagement with the other of said plates, spring means interposed between one of said plates and one of said pulleys, said spring means being tensioned to impose a compression force on said one of said plates to urge the same in a direction for frictional engagement of the other of said plates, means for adjusting the position of said one of said pulleys with respect to said one of said plates and thereby varying the force on said spring means to adjust the frictional force between the two confronting plates, means connecting said one of said pulleys to said one of said plates, means connecting the other of said pulleys to said driving shaft, and means for drivingly coupling said other of said pulleys to said other of said plates in response to rotation of said shaft in one direction only.

5. In an automatic washing machine having an agitator shaft and a spin-tube shaft, the combination of a reversibly rotatable motor shaft and mechanism for driving said agitator shaft from said motor shaft when the latter rotates in one direction and for driving said spin-tub shaft from said motor shaft when the latter rotates in the other direction; said mechanism comprising a first pulley coupled to said motor shaft to rotate therewith, a second pulley mounted to rotate on said motor shaft, a pair of confronting plates interposed between said pulleys and rotatable about said motor shaft, one-way clutch means between said first pulley and one of said plates to drive the latter upon rotation of said first pulley in said other direction only, friction means between said plates to drive the other of said plates in response to rotation of said one of said plates, and means for drivingly connecting said other of said plates to said second pulley.

6. In an automatic washing machine having an agitator shaft and a spin-tub shaft, the combination of a reversibly rotatable motor shaft and mechanism for driving said agitator shaft from said motor shaft when the latter rotates in one direction and for driving said spin-tub shaft from said motor shaft when the latter rotates in the other direction; said mechanism comprising a first pulley coupled to said motor shaft to rotate therewith, a second pulley mounted to rotate on said motor shaft, a pair of confronting plates interposed between said pulleys and rotatable about said motor shaft, one-way clutch means between said first pulley and one of said plates to drive the latter upon rotation of said first pulley in said other direction only, friction means between said plates to drive the other of said plates in response to rotation of said one of said plates, means for drivingly connecting said other of said plates to said second pulley, resilient means for maintaining said plates in frictional engagement with each other, and means for adjusting said resilient means to vary the friction between said plates.

7. A one-way clutch unit comprising a sleeve, a pair of axially aligned pulleys, one of said pulleys being affixed to said sleeve, the other of said pulleys being rotatable about said sleeve, a pair of frictionally engageable clutch elements mounted rotatably on said sleeve between and concentric with said pulleys, resilient means for maintaining said elements in frictional interengagement, means for coupling one of said elements to one of said pulleys, one-way clutch means for connecting the other of said elements to the other of said pulleys, and means for adjusting said resilient means to vary the frictional interengagement between said elements.

8. A one-way clutch unit comprising a sleeve, a pair of pulleys, one of said pulleys being affixed to said sleeve, the other of said pulleys being rotatable about said sleeve, a pair of confronting clutch plates mounted rotatably on said sleeve, frictional material bonded to one of said plates and carried thereby for engagement with the other of said plates, resilient means for maintaining said plates in position and for urging said plates toward one another to establish frictional engagement therebetween through said resilient material, means for connecting one of said plates to one of said pulleys, one-way clutch means for connecting the other of said plates to the other of said pulleys, and means for adjusting said resilient means to vary the frictional interengagement between said plates.

References Cited in the file of this patent
UNITED STATES PATENTS

| 1,958,070 | Schmid et al. | May 8, 1934 |
| 2,412,331 | Green | Dec. 10, 1946 |

UNITED STATES PATENT OFFICE

CERTIFICATE OF CORRECTION

Patent No. 2,932,219                      April 12, 1960

James R. Hubbard et al.

It is hereby certified that error appears in the printed specification of the above numbered patent requiring correction and that the said Letters Patent should read as corrected below.

Column 2, line 67, for "see" read -- seen --; column 3, line 53, for "pully" read -- pulley --; same column 3, line 62, and column 4, line 15, for "tube", each occurrence, read -- tub --; column 5, line 20, for "spin-tube" read -- spin-tub --.

Signed and sealed this 29th day of November 1960.

(SEAL)
Attest:

KARL H. AXLINE
Attesting Officer

ROBERT C. WATSON
Commissioner of Patents